United States Patent
Deliwala et al.

(10) Patent No.: US 8,326,712 B2
(45) Date of Patent: *Dec. 4, 2012

(54) METHOD AND SYSTEM FOR TECHNOLOGY CONSUMPTION MANAGEMENT

(75) Inventors: Manish K. Deliwala, Chandler, AZ (US); Ashish Goulatia, Peoria, AZ (US); Noreen Williams, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1200 days.

This patent is subject to a terminal disclaimer.

(21) Appl. No.: 10/628,731

(22) Filed: Jul. 28, 2003

(65) Prior Publication Data

US 2004/0210496 A1    Oct. 21, 2004

Related U.S. Application Data

(60) Provisional application No. 60/463,474, filed on Apr. 16, 2003.

(51) Int. Cl.
  *G06F 15/02* (2006.01)
  *G06Q 40/00* (2012.01)
(52) U.S. Cl. .......................... 705/32; 705/40
(58) Field of Classification Search .............. 705/30
  See application file for complete search history.

(56) References Cited

U.S. PATENT DOCUMENTS

| | | | |
|---|---|---|---|
| 5,253,166 A | 10/1993 | Dettelbach et al. | |
| 5,717,865 A | 2/1998 | Stratmann | |
| 5,832,451 A | 11/1998 | Flake et al. | |
| 5,910,987 A * | 6/1999 | Ginter et al. | 705/52 |
| 5,963,939 A | 10/1999 | McCann et al. | |
| 5,991,741 A * | 11/1999 | Speakman et al. | 705/30 |
| 6,009,408 A | 12/1999 | Buchanan | |
| 6,023,679 A | 2/2000 | Acebo et al. | |
| 6,072,493 A * | 6/2000 | Driskell et al. | 715/854 |
| 6,125,354 A * | 9/2000 | MacFarlane et al. | 705/34 |
| 6,128,602 A | 10/2000 | Northington et al. | |
| 6,169,979 B1 * | 1/2001 | Johnson | 705/412 |
| 6,195,643 B1 | 2/2001 | Maxwell | |
| 6,219,654 B1 | 4/2001 | Ruffin | |
| 6,321,205 B1 | 11/2001 | Eder | |
| 6,411,936 B1 | 6/2002 | Sanders | |

(Continued)

FOREIGN PATENT DOCUMENTS

JP    2004110577    8/2004

(Continued)

OTHER PUBLICATIONS

USPTO; Office Action dated Oct. 31, 2007 in U.S. Appl. No. 10/708,566.

(Continued)

*Primary Examiner* — Fahd Obeid
(74) *Attorney, Agent, or Firm* — Snell & Wilmer L.L.P.

(57) ABSTRACT

A method and system for tracking expenditures incurred by an entity involves determining the costs incurred, reading a file containing business model information, and allocating the costs according to the business model information. The business model information includes information regarding the internal structure of the entity including groups and sub-groups within the entity. Furthermore, value drivers of the entity and application profiles of the entity are also taken into consideration in determining whether various groups and sub-groups within the entity are performing optimally.

14 Claims, 2 Drawing Sheets

U.S. PATENT DOCUMENTS

| | | | |
|---|---|---|---|
| 6,442,526 | B1 | 8/2002 | Vance et al. |
| 6,453,269 | B1 | 9/2002 | Quernemoen |
| 6,519,823 | B1 | 2/2003 | Sugata et al. |
| 6,526,387 | B1 | 2/2003 | Ruffin et al. |
| 6,850,643 | B1* | 2/2005 | Smith et al. ............... 382/173 |
| 7,020,628 | B2* | 3/2006 | Peterson et al. .............. 705/32 |
| 7,050,986 | B1 | 5/2006 | Vance et al. |
| 7,054,823 | B1 | 5/2006 | Briegs et al. |
| 7,395,231 | B2 | 7/2008 | Steury et al. |
| 7,539,620 | B2 | 5/2009 | Winterton et al. |
| 7,617,136 | B1 | 11/2009 | Lessing et al. |
| 2001/0032123 | A1 | 10/2001 | Burns et al. |
| 2002/0007327 | A1 | 1/2002 | Steury et al. |
| 2002/0010686 | A1 | 1/2002 | Whitesage |
| 2002/0016729 | A1 | 2/2002 | Breitenbach et al. |
| 2002/0026416 | A1 | 2/2002 | Provinse |
| 2002/0069102 | A1 | 6/2002 | Vellante et al. |
| 2002/0091994 | A1 | 7/2002 | McCready et al. |
| 2002/0143590 | A1 | 10/2002 | Dhong et al. |
| 2002/0147676 | A1 | 10/2002 | Karmali |
| 2002/0169658 | A1 | 11/2002 | Adler |
| 2003/0046195 | A1 | 3/2003 | Mao |
| 2003/0061140 | A1 | 3/2003 | Chen |
| 2003/0149632 | A1 | 8/2003 | Walker et al. |
| 2003/0212617 | A1 | 11/2003 | Stone et al. |
| 2004/0035922 | A1* | 2/2004 | Cameron ................. 235/377 |
| 2004/0153348 | A1 | 8/2004 | Garback |
| 2005/0256737 | A1 | 11/2005 | Liu |
| 2005/0289025 | A1 | 12/2005 | Fredericks et al. |
| 2007/0016523 | A1 | 1/2007 | Blair et al. |

FOREIGN PATENT DOCUMENTS

| | | |
|---|---|---|
| WO | 0217201 | 2/2002 |

OTHER PUBLICATIONS

USPTO; Final Office Action dated Apr. 4, 2008 in U.S. Appl. No. 10/708,566.
USPTO; Office Action dated Dec. 24, 2008 in U.S. Appl. No. 10/708,566.
USPTO; Final Office Action dated Jun. 19, 2009 in U.S. Appl. No. 10/708,566.
USPTO; Advisory Office Action dated Oct. 28, 2009 in U.S. Appl. No. 10/708,566.
USPTO; Office Action dated Nov. 25, 2009 in U.S. Appl. No. 10/708,566.
USPTO; Final Office Action dated Mar. 3, 2010 in U.S. Appl. No. 10/708,566.
USPTO; Advisory Office Action dated May 27, 2010 in U.S. Appl. No. 10/708,566.
USPTO; Office Action dated Jun. 16, 2010 in U.S. Appl. No. 10/708,566.
USPTO; Final Office Action dated Nov. 15, 2010 in U.S. Appl. No. 10/708,566.
USPTO; Advisory Office Action dated Feb. 4, 2011 in U.S. Appl. No. 10/708,566.
USPTO; Office Action dated Jan. 10, 2008 in U.S. Appl. No. 11/289,228.
USPTO; Office Action dated Sep. 16, 2008 in U.S. Appl. No. 11/289,228.
USPTO; Office Action dated May 27, 2009 in U.S. Appl. No. 11/289,228.
USPTO; Office Action dated Nov. 24, 2009 in U.S. Appl. No. 11/289,228.
USPTO; Office Action dated Apr. 13, 2010 in U.S. Appl. No. 11/289,228.
USPTO; Final Office Action dated Sep. 30, 2010 in U.S. Appl. No. 11/289,228.
USPTO; Advisory Action dated Dec. 8, 2010 in U.S. Appl. No. 11/289,228.
USPTO; Office Action dated Jan. 6, 2011 in U.S. Appl. No. 11/289,228.
USPTO; Final Office Action dated Jul. 11, 2011 in U.S. Appl. No. 11/289,228.
USPTO; Office Action dated Feb. 4, 2009 in U.S. Appl. No. 11/042,663.
USPTO; Final Office Action dated Aug. 20, 2009 in U.S. Appl. No. 11/042,663.
USPTO; Advisory Action dated Dec. 1, 2009 in U.S. Appl. No. 11/042,663.
USPTO; Office Action dated May 10, 2010 in U.S. Appl. No. 11/042,663.
USPTO; Final Office Action dated Oct. 29, 2010 in U.S. Appl. No. 11/042,663.
USPTO; Advisory Action dated Jan. 28, 2011 in U.S. Appl. No. 11/042,663.
USPTO; Office Action dated Mar. 25, 2011 in U.S. Appl. No. 11/042,663.
USPTO; Final Office Action dated Aug. 2, 2011 in U.S. Appl. No. 11/042,663.
AU; First Examiner's Report dated Mar. 30, 2010 in Application No. 2005271396.
AU; Second Examiner's Report dated Aug. 24, 2010 in Application No. 2005271396.
EP; European Search Report dated Mar. 23, 2009 in Application No. 05778268.2.
EP; Examination Report dated Jun. 4, 2009 in Application No. 05778268.2.
JP; Office Action dated Mar. 18, 2011 in Application No. 2007-525003.
MX; Office Action dated Aug. 2009 in Application No. Mx/a/2007/001488.
CO; Office Action dated Apr. 2009, in Application No. 07.011.478.
PCT; International Search Report dated Mar. 2, 2006 in Application No. PCT/US2005/027792.
PCT; Written Opinion dated Mar. 2, 2006 in Application No. PCT/US2005/027792.
PCT; International Preliminary Report on Patentability dated Feb. 6, 2007 in Application No. PCT/US2005/027792.
http://web.archive.org/web/20040213185624.www47.
americanexpress.com/corporateservices/newsroom/press/press_26.asp.
"Core One Credit Union—Discover the Advantage", < http://coreone.org/2visa.html >, Copyright2001, (Last Visited Oct. 9, 2002).
Liam Lahey, "Microsoft Bolsters Rebate Structure", Computer Dealer News (Feb. 8, 2002).
Joan Goldwasser, "Best of the Cash-back Cards", Kiplinger's Personal Finance Magazine (Apr. 1999).
Gordon Carey, "Multi-tier Copay", Pharmaceutical Executive (Feb. 2000).
"New Evidence about Positive Three-Tier Co-pay Performance Presented at Express Scripts 2000Outcomes Conference", PR Newswire Association, Inc. (Jun. 28, 2000).
Eric Schmuckler, "Playing Your Cards Right", Forbes (Dec. 28, 1987).
Mary Kuntz, "Credit Cards as Good as Gold", Forbes (Nov. 4, 1985).
Judy Nyman, "Free Income Tax Clinics are Opening as Apr. 30 Deadline Draws Nearer", TheToronto Star (Mar. 25, 1986, Final Edition).
Michael Obel, "Oil Companies Push Marketing, Cost Cutting to Fortify Earnings", Oil &Gas Journal (Sep. 16, 1985).
"The Chase Manhattan Bank Today Announced a Comprehensive Program to Enhance the Value of All its Credit Cards", PR Newswire (Dec. 18, 1986).
Credit Cards Offer Travelers New Benefit, PR Newswire (Aug. 5, 1987).
"Shell Introduces Optional Credit Card", The Associated Press (Sep. 3, 1985).
"Shell-Oil; Introduces Shell Signature Travel and Entertainment Credit Card", Business Wire (Sep. 3, 1985).
"Prestige Credit Cards: Those Pricey Plastics", Changing Times (Apr. 1986).
"Shell Introducing Expanded 'Signature' Credit Card", Tulsa Business Chronicle (Sep. 9, 1985).
USPTO; Final Office Action dated Aug. 11, 2011 in U.S. Appl. No. 10/708,566.

USPTO; Advisory Action dated Oct. 28, 2011 in U.S. Appl. No. 10/708,566.
USPTO; Office Action dated Nov. 30, 2011 in U.S. Appl. No. 10/708,566.
USPTO; Advisory Action dated Sep. 30, 2011 in U.S. Appl. No. 11/289,228.
USPTO; Office Action dated Nov. 14, 2011 in U.S. Appl. No. 11/289,228.
USPTO; Advisory Action dated Sep. 29, 2011 in U.S. Appl. No. 11/042,663.
USPTO; Office Action dated Nov. 23, 2011 in U.S. Appl. No. 11/042,663.
USPTO; Final Office Action dated Apr. 25, 2012 in U.S. Appl. No. 10/708,566.
USPTO; Advisory Action dated Jun. 20, 2012 in U.S. Appl. No. 10/708,566.
USPTO; Notice of Allowance dated Jun. 29, 2012 in U.S. Appl. No. 11/289,228.
USPTO; Final Office Action dated Apr. 19, 2012 in U.S. Appl. No. 11/042,663.
USPTO; Advisory Action dated Jun. 28, 2012 in U.S. Appl. No. 11/042,663.
CR; Expert's Opinion received Feb. 3, 2012 in Application No. 8890.

* cited by examiner

METHOD AND SYSTEM FOR TECHNOLOGY CONSUMPTION MANAGEMENT

CROSS-REFERENCE TO RELATED APPLICATIONS

This application claims priority from U.S. Provisional Application Ser. No. 60/463,474, filed Apr. 16, 2003, the entire contents of which are hereby incorporated by reference.

FIELD OF INVENTION

This application generally relates to managing the use of technology, and more particularly, to a method and system for identifying the consumption of raw technology resources by an organization to review, understand, and increase the value of the technology to the organization and to help an organization ensure an adequate return on the operational cost of technology.

BACKGROUND OF THE INVENTION

It is very important for entities to be able to track their expenses. A growing portion of many entity's expenditures are related to computers, including costs for computers, peripherals, and support personnel. In the past, entities purchased or leased computers, servers, and the like on a fixed-price basis. That is, an entity would pay a fixed price for the use of a computer, regardless of how much they actually used the computer. An entity would also incur the salary costs for certain people to operate and maintain the computers and the facility costs for housing the equipment.

Recently, a trend has emerged with computing providers selling computing time on a unit basis. In a manner similar to electric companies selling electricity by the amount of electricity used, computing providers sell computing power based on the amount of computing time used. There are various benefits for the users of such a utility type pricing system. For example, entities may have fluctuating needs wherein, one week, the entity may have large computing needs, but the next they may not have large computing needs. In such a situation, under traditional pricing, the entity would be forced to buy enough computers, servers, and the like to cover their peak needs.

Under traditional pricing schemes, during slower times, the computers and servers are not used as often, but payments related to the computers still must be paid. If the entity tries to compensate by purchasing fewer or less expensive computers and servers, they may encounter the opposite problem—they may have adequate computing power during slow times, but inadequate computing power during peak times. If the entity is dependent on adequate computing power being available at all times (for example, the entity runs an e-commerce business or otherwise desires 24-hour access by customers), the lack of computing power may result in lost business to the entity. The utility type pricing scheme reduces these problems, as short-term spikes or dips in computing needs are compensated for by the resultant spike or dip in computing costs.

However, under the utility pricing scheme, it may be more difficult to plan for future costs because, for example, peak times may not always be predictable. Another reason is that it is not always easy to determine how the computing time is being spent and where it is being spent. In certain instances, computing providers using utility pricing do not separate costs per job, merely presenting a bill periodically. Therefore, an entity that has a dozen internal groups each using utility pricing may not be able to determine which groups are in need of more computing power or less computing power. In addition, with the integration of systems and the evolution of user interfaces, it becomes difficult for users to perceive how much processor time they are using, thus making it easier for a user to inadvertently spend too much on computing.

With both traditional pricing models and utility pricing models, it is very important for organizations to limit costs in order to remain competitive in the marketplace. But it is also important to maintain sufficient computing power to be able to handle the variety of different tasks being performed.

It is desirable for an entity to be able to more easily track past expenses and forecast future expenditures.

SUMMARY OF THE INVENTION

The present invention solves some of the problems in the prior art by identifying the consumption of raw technology resources by an entity in order to track past expenses and forecast future expenditures. An exemplary method of the present invention includes receiving billing information from a provider. A business model file is read, then the billing information is allocated according to the business model.

The business model includes information regarding the business dimensions of the entity. Business dimensions include business processes, organizational information, and associated business performance metrics. The organizational information includes groups in which the entity is divided as well as sub-groups for further subdivision of the business.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

Figure 1:
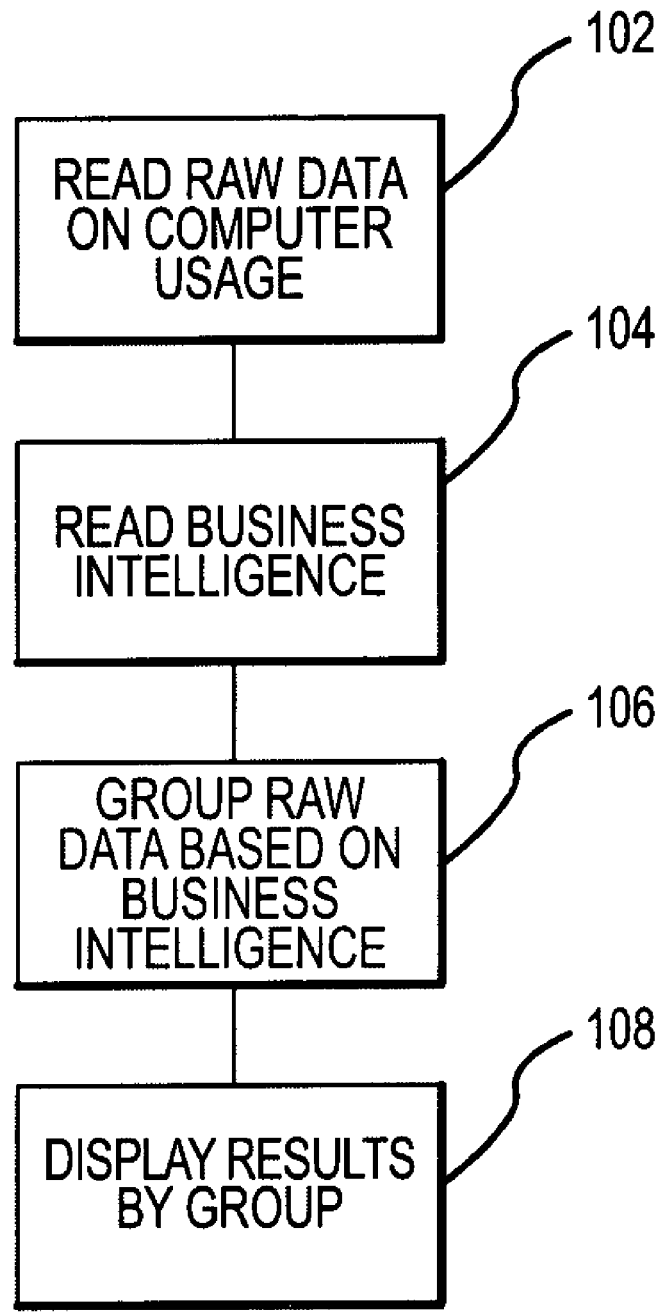
FIG. 1 is a flow chart illustrating the processing of cost information.

The present invention may be described herein in terms of various functional components and various processing steps. It should be appreciated that such functional components may be realized by a variety of different hardware or structural components configured to perform the specified functions. For purposes of illustration only, exemplary embodiments of the present invention will be described herein. Further, it should be noted that, while various components may be suitably coupled or connected to other components, such connections and couplings may be realized by a direct connection between components, or by a connection through other components and devices.

Within an entity, there may be distinct groups or departments. Each group or department has their own computing needs. For example, a technology company may have an accounting group and an engineering group. A financial institution may have a home loan department and a banking department. In addition, internal organization may be geographic in nature. For example, a group may only include European countries or only include various states of the United States. In such a manner, company statistics can be determined on a geographic basis. It is often desirable to determine costs used by each group or department. Within each group or department, there may be one or more sub-groups. For example, an engineering group may have several different sub groups, one for each particular job being performed by the engineering group. For example, a semiconductor manufacturer may have different sub-groups for each product being developed. In a similar manner, any entity may have many groups and sub-groups.

A provider of utility-priced computing services typically prices its services based on processor usage time, for example, on a CPU-second basis—namely, for each second of processing time used, a fee is charged, typically based on a predetermined schedule. For example, an entity may negotiate with the provider for a charge of $X per second of usage, with the X variable depending on how many total CPU seconds were used or are expected to be used. In such a manner, an entity can negotiate a volume discount or a stepped-type of pricing, wherein usage above a certain number of seconds is at a different rate. Pricing is also typically determined by a variety of other factors including volume, peak/off-peak usage, geographic location, services provided, performance expectations, and the like.

One problem with such a pricing scheme is that the entities are billed based only on the number of seconds used. One method to minimize such a problem would be to establish a separate account with the provider for each group within an entity. In such a manner, each group has its group expenditures separated from expenditures of other groups and the provider would bill each group separately for computing services. Several disadvantages are presented, however. For example, the use of a separate account for each group reduces the benefits of having only a single bill to pay. In addition, costs within each group are not separated. For example, a group may have multiple projects. Even if costs are separated by group, individual projects within a group are typically not separated.

With reference to FIG. 1, a flowchart illustrating the operation of a system of the present invention is shown. A computing provider supplies its raw billing data to the system (step 102). The raw billing data includes all the computing time used by the entity during a certain time period. This data may be organized by jobs, wherein each specific job executed by the computing provider is individually tracked and reported by the computing provider to the system of the present invention. Thereafter, a system of the present invention reads a "business model" file that contains data as to how the business that incurred the costs is organized (step 104). The raw data is then grouped according to the business model (step 106). Thereafter, the data, now sorted according to the internal organization of the entity, can be displayed (step 108) or used in a variety of different manners.

Figure 2:
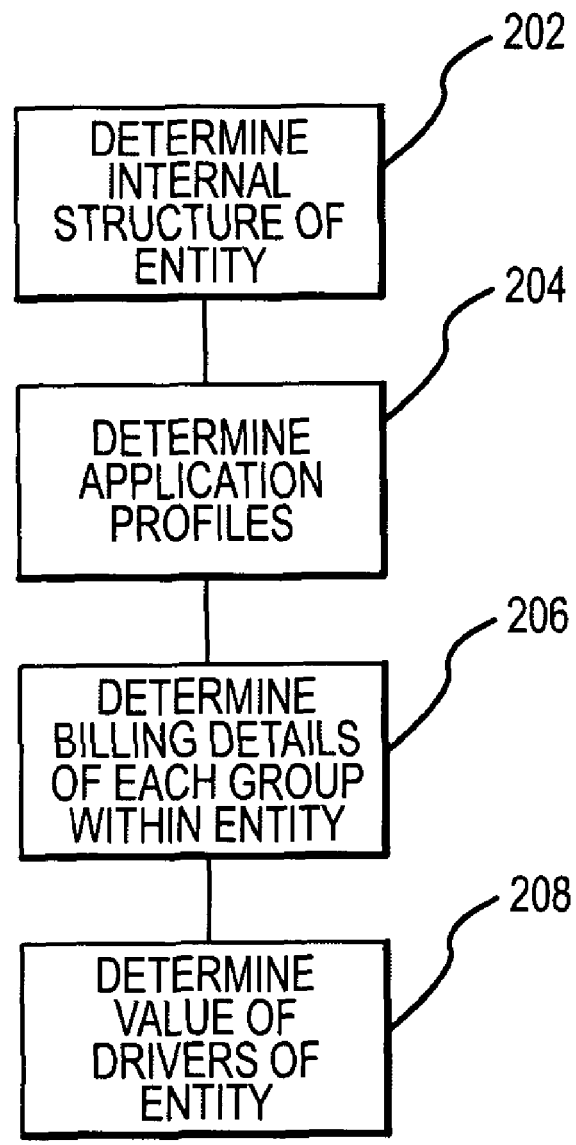
FIG. 2 is a flow chart illustrating the creation of a business model file.

With reference to FIG. 2, further explanation is provided as to the creation of a business model file. The business model file contains the various business dimensions of the entity. The internal structure of the entity is determined (step 202). This entails determining the groups within the entity and how each group is organized. As described above, an entity may have several major groups such as an engineering group and an accounting group. Each group may be further divided into sub-groups. For example, an accounting group may be divided into accounts payable and accounts receivable. The entity may be divided into as many groups and sub-groups as the entity desires, in order to make a more accurate depiction of expenditures. This determining step is typically performed by the entity and promulgated to a system of the present invention.

The application profiles are determined (step 204). For example, each group and sub-group have certain tasks performed by the computing provider. The application profiles identify each task with a group or sub-group. Typically, processor usage time is associated with a unique identifier. In turn, the application profiles associate each unique identifier with a group or subgroup. In a similar manner, expenses for products under traditional pricing models can also be divided among groups and sub-groups according to which group or sub-group incurred the expenses.

The billing details of each group and sub-group within the entity is then determined (step 206). The billing details include how each group and sub-group use computing services.

With continued reference to FIG. 2, the value drivers of the entity are then gathered from the entity (step 208). Value drivers are the criteria used by the entity to determine if they are successful. For example, one company may consider cost per transaction to be very important, especially for future expansion purposes. In contrast, another company may be more concerned with total costs incurred.

Once all the information is gathered, the business model is stored and used as described above. In particular, while the various jobs performed by the computing provider are assigned a unique identifier, those unique identifiers are not otherwise used by the computing provider, which only provides a bill for the total services provided. Using the business model, an embodiment of the present invention is able to determine exactly how much computing time was used by each group and sub-group within an entity. In addition, an organization using an embodiment of the present invention is able to examine technology operational costs in the various groups allowing the organization to make a more informed, value-based decision regarding its technology portfolio.

After all the above processes have been performed, the costs can be analyzed and it can be determined if too much CPU time is used for certain tasks. For example, the benefits of running a weather simulation every 15 minutes may be outweighed by the costs incurred in running the simulation that often. For a financial institution processing credit card authorizations, it may be determined that performing a credit card authorization for purchases below a certain amount (e.g., $25) may not be cost effective in terms of the number of determinations of non-authorizations.

In addition, the costs can be presented in a variety of different manners. For example, the costs can be displayed graphically, such that a meaningful comparison of costs can be made. Such comparisons can be across different groups and sub-groups or such comparisons may be within group or sub-group, comparing costs during different time periods. In addition, costs can be presented in a format that allows easy data manipulation. For example, the costs can be translated into a spreadsheet format such that a user can examine the costs using tools of his preference.

The present invention is described herein with reference to block diagrams, flowchart illustrations of methods, systems, and computer program products according to various aspects of the invention. It will be understood that each functional block of the block diagrams and the flowchart illustrations, and combinations of functional blocks in block diagrams and flowchart illustrations, respectively, may be implemented by computer program instructions. These computer program instructions may be loaded on a general purpose computer, special purpose computer, or other programmable data processing apparatus to produce a machine, such that the instructions which execute on the computer or other programmable data processing apparatus create means for implementing the functions specified in the flowchart block or blocks.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded on a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The system may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., Windows NT, 95/98/2000, Linux, Solaris, etc.) as well as various conventional support software and drivers typically associated with computers. User computer can be in a home or business environment with access to a network. In an exemplary embodiment, access is through the Internet through a commercially-available web-browser software package.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention.

Benefits, other advantages, and solutions to problems have been described above with regard to specific embodiments. No element described herein is required for the practice of the invention unless expressly described as "essential" or "critical."

We claim:

1. A method comprising:
    receiving, by a computer based system for managing asset consumption, billing information associated with consumption of computer-related hardware processing resources from a computer-related hardware processing resource provider, wherein the billing information includes a unique hardware processing job identifier which identifies a specific project associated with each hardware processing job executed by the computer-related hardware processing resource provider for an entity;
    reading, by the computer based system, a business model file comprising a business dimension within the entity, the business dimension including organizational information including a list of a plurality of groups within the entity;
    calculating, by the computer based system, a benefit of each hardware processing job;
    allocating, by the computer based system, the billing information by associating each of the received unique hardware processing job identifiers to a group in the plurality of groups;
    displaying, by the computer based system, the costs incurred by each group graphically during different time periods;
    assessing, by the computer based system, benefits of each hardware processing job as compared with the costs of each hardware processing job; and
    making, by the computer based system, a value based decision based on the assessment.

2. The method of claim 1, wherein the business dimension further comprises a business process and an associated business performance metric.

3. The method of claim 2, wherein the allocating step further comprises determining a total cost associated with computer-related hardware processing resources from the provider incurred by each group.

4. The method of claim 3, wherein the reading step further comprises:
    determining an internal structure of the entity, including the plurality of groups within the entity;
    determining a billing detail of the plurality of groups within the entity; and
    determining an application profile of the entity.

5. A computer based system, comprising:
    a computer network communicating with a memory;
    the memory communicating with a processor for managing asset consumption; and the processor, when executing a computer program, is configured to:
- receive, by the computer based system, billing information associated with consumption of computer-related hardware processing resources from a computer-related hardware processing resource provider, wherein the billing information includes a unique hardware processing job identifier which identifies a specific project associated with each hardware processing job executed by the computer-related hardware processing resource provider for an entity;
- read, by the computer based system, a business model file comprising a business dimension within the entity, the business dimension including organizational information including a list of a plurality of groups within the entity;
- calculate, by the computer based system, a benefit of each hardware processing job;
- display, by the computer based system, the costs incurred by each group graphically during different time periods;
- assess, by the computer based system, benefits of each hardware processing job as compared with the costs of each hardware processing job; and
- make, by the computer based system, a value based decision based on the assessment.

6. The computer based system of claim 5, wherein the business dimension further comprises a business process and an associated business performance metric.

7. The computer based system of claim 6, wherein the allocating further comprises determining a total cost associated with computer-related hardware processing resources from the provider incurred by each group.

8. The computer based system of claim 7, wherein the processor, when executing the computer program, is further configured to:
- determine an internal structure of the entity, including the plurality of groups within the entity;
- determine a billing detail of the plurality of groups within the entity; and
- determine an application profile of the entity.

9. The computer based system of claim 8, wherein the processor, when executing the computer program, is further configured to:
- assess a technology operational cost in the groups; and
- make a value based decision based on the assessment.

10. A non-transitory, tangible computer-readable storage medium having stored thereon a plurality of instructions, when executed by a computer based system for managing asset consumption, perform operations comprising:
- receiving, by the computer based system, billing information associated with consumption of computer-related hardware processing resources from a computer-related hardware processing resource provider, wherein the billing information includes a unique hardware processing job identifier which identifies a specific project associated with each hardware processing job executed by the computer-related hardware processing resource provider for an entity;
- reading, by the computer based system, a business model file comprising a business dimension within the entity, the business dimension including organizational information including a list of a plurality of groups within the entity;
- calculating by the computer based system, a benefit of each hardware processing job;
- displaying, by the computer based system, the costs incurred by each group graphically during different time periods; and
- assessing, by the computer based system, benefits of each hardware processing job as compared with the costs of each hardware processing job; and
- making, by the computer based system, a value based decision based on the assessment.

11. The computer-readable medium of claim 10, wherein the business dimension further comprises a business process and an associated business performance metric.

12. The computer-readable medium of claim 11, wherein the allocating further comprises determining a total cost associated with computer-related hardware processing resources from the provider incurred by each group.

13. The computer-readable medium of claim 12, wherein the reading further comprises:
- determining an internal structure of the entity, including the plurality of groups within the entity;
- determining a billing detail of the plurality of groups within the entity; and
- determining an application profile of the entity.

14. The method of claim 4, further comprising displaying the costs incurred by each group graphically; wherein a comparison of costs for each group is possible.

* * * * *